(12) United States Patent
de Mattos

(10) Patent No.: US 7,954,658 B2
(45) Date of Patent: Jun. 7, 2011

(54) PROCEDURE FOR DESCENT OF EQUIPMENT TO BOTTOM OF SEA

(75) Inventor: Jose Mauricio Ferreira de Mattos, Rio de Janeiro (BR)

(73) Assignees: Inspectronics Engenharia e Consultoria LTDA, Rio je Janeiro (BR); Zytech—Pesquisa, Desenvolvimento e Tecnologia Industrial LTDA, Rio de Janeiro (BR)

( * ) Notice: Subject to any disclaimer, the term of this patent is extended or adjusted under 35 U.S.C. 154(b) by 0 days.

(21) Appl. No.: 12/151,147

(22) Filed: May 1, 2008

(65) Prior Publication Data
US 2009/0194012 A1   Aug. 6, 2009

(30) Foreign Application Priority Data
Feb. 1, 2008   (BR) .............................. PI 0800140-5

(51) Int. Cl.
*F16L 1/00* (2006.01)
(52) U.S. Cl. ......... 212/306; 212/270; 405/206; 405/209
(58) Field of Classification Search .................. 212/307, 212/308, 270; 405/206, 209
See application file for complete search history.

(56) References Cited

U.S. PATENT DOCUMENTS

| | | | | |
|---|---|---|---|---|
| 2,614,518 | A * | 10/1952 | Carter | 114/51 |
| 4,498,412 | A | 2/1985 | Liden | |
| 4,829,928 | A | 5/1989 | Bergman | |
| 4,869,192 | A | 9/1989 | Pawolski | |
| 4,909,174 | A | 3/1990 | Bowes | |
| 4,987,846 | A | 1/1991 | Yamashita et al. | |
| 5,215,410 | A | 6/1993 | Karal | |
| 6,378,450 | B1 | 4/2002 | Begnaud et al. | |
| 6,457,908 | B1 * | 10/2002 | Bergeron | 405/224 |
| 6,565,286 | B2 | 5/2003 | Carr et al. | |
| 7,308,863 | B2 | 12/2007 | de Baan | |
| 7,527,006 | B2 * | 5/2009 | Khachaturian | 114/50 |
| 2001/0026733 | A1 | 10/2001 | Ludwigson | |
| 2001/0037757 | A1 | 11/2001 | Bringedal et al. | |
| 2002/0064092 | A1 * | 5/2002 | Nishimura | 367/128 |
| 2005/0152748 | A1 * | 7/2005 | Tangen et al. | 405/209 |
| 2005/0160959 | A1 * | 7/2005 | Roodenburg et al. | 114/258 |
| 2009/0129867 | A1 * | 5/2009 | Millheim | 405/166 |
| 2009/0194013 | A1 | 8/2009 | de Mattos | |
| 2009/0232605 | A1 * | 9/2009 | Breivik | 405/203 |

FOREIGN PATENT DOCUMENTS
BR   200306058 A   8/2005

* cited by examiner

*Primary Examiner* — Thomas J. Brahan
(74) *Attorney, Agent, or Firm* — TraskBritt

(57) ABSTRACT

The present invention refers to a process to permit descent to sea bottom, with the use of two conventional tug boats, of equipment used in submarine field oil field exploration, especially descent of equipment of large size and mass in deep water fields.

Equipment is being suspended by a sling, attached to an auxiliary component. This, on its turn, is attached to two cables, each one activated by one of the two tug boats. Connection of the auxiliary component to cables is being made by means of connectors, which are trespassed thru cable openings and attached to auxiliary component by screws, forming a connection, in which connectors may carry out a pivotal movement around holes of auxiliary component. This movement of said connectors almost entirely absorbs oscillations of tug boats caused by waves, without transmitting same to equipment. In this way, both tug boats may lower equipment and cross the so-called resonance area without risk of its occurrence.

8 Claims, 3 Drawing Sheets

CORTE A-A

PROCEDURE FOR DESCENT OF EQUIPMENT TO BOTTOM OF SEA

CROSS-REFERENCE TO RELATED APPLICATION

This application claims the benefit of the filing date of Brazilian Patent Application Ser. No. PI 0800140-5 filed Feb. 1, 2008.

FIELD OF THE INVENTION

The present invention refers to a procedure to permit descent to the sea bottom of equipment used in oil exploration in submarine oil fields, especially descent of equipment of large size and mass in deep water fields, with utilization of conventional tug boats, rendering unnecessary contracting of special vessels for this purpose.

BACKGROUND OF THE INVENTION

Usually, descending equipment of large size and mass, such as manifolds, to the sea bottom in submarine oil extraction fields, especially in deep water fields, requires utilization of special vessels, provided with heavy duty cranes, vertical movement compensators (the so-called heave compensator) and/or other facilities. Such vessels, in addition of having a very high lease cost, are not always promptly available for contracting at the occasion they are needed, which may result in difficulties for the continuity of oil extracting operations.

Consequently, one of the concerns of companies engaged in oil exploration in submarine fields consists in looking for solutions, eliminating, as much as possible, the requirement for using such special vessels.

RELATED ART

In the submarine oilfield exploration, one of the activities where the use of special vessels is mostly required, involves transportation and descent to the sea bottom of equipment of large size and mass. This activity involves four phases:
(a) loading equipment aboard vessel;
(b) transportation to site;
(c) removal of equipment from vessel and positioning for descent to sea bottom;
(d) descent of equipment to sea bottom.

Phase one offers no problems, since the equipment is in harbor or yard, where it was manufactured. These sites normally have cranes and other facilities to place the equipment aboard the vessel which will take them to the oil exploration site.

Phase two also offers no larger difficulties and only a vessel is required with adequate capability and space aboard to haul the equipment.

Phase three offers more problems, Hauling equipment of large size and mass in the sea and position it to be lowered to the bottom usually requires a special vessel, equipped with heavy duty cranes and other facilities, and vessels with such resources not only imply in high lease costs, but also are scarce on the market.

When deep water oil fields are involved, phase four also is a problem area. In submarine oil fields, cables are being used, activated from barges equipped with heavy duty cranes, adapted to the floating hull, or semi-submersible complementary platforms to lower equipment to bottom of the sea, such as, for example, manifolds. In shallow water fields, such a procedure does not imply in larger problems. However, in deep water fields, the equipment needs to cross a region, named resonance zone, where the set of vessels, cables, equipments enter into resonance as a consequence of the movement of vessels, caused by waves, and this may result in originating forces capable of causing cable ruptures or equipment damages. This problem has been overcome more frequently by using special vessels which are equipped with resources to compensate the movement caused by the waves. This has shown to be a difficult alternative not only due to the high lease cost of such vessels, but also to the reduced availability of such vessels on the market.

Another alternative presented by Brazilian patent PI 0306058-6 (Pendulous Method for Installation of Equipment at the Bottom of the Sea in Offshore Operations) which proposes utilization of two vessels to accomplish the operation of descent. The first vessel maintains equipment to be lowered positioned slightly below the sea surface, while the second vessel moves away, extending a cable previously attached to equipment. When the cable attains a required length, the first vessel releases the equipment which, due to the action of the cable and its specific weight, carries out a pendulous softened movement until a position close to the sea bottom, crossing the resonance area in a situation, in which this cannot occur.

While this second alternative resolves the problem presented by the first alternative, it evidences other limitations, one being the lack of control of the speed of descent of the equipment.

SUMMARY OF THE INVENTION

The present invention proposes a procedure, dispensing use of special vessels to descend equipment of large sizes and mass to the sea bottom in submarine oil exploration fields, permitting, at the same time, to maintain adequate speed control for descent of equipment, simultaneously avoiding problems of the resonance area.

This procedure is based on the use of two common vessels for this type of operation, tug boats with dynamic positioning, A.H.T.S. (Anchor, Handling, Tug, Supply), which descend equipment thru cables connected to an auxiliary component which, on its turn, is attached to the equipment being lowered. The utilization of this auxiliary component, combined with the procedure of descent, permits to neutralize movement of vessels, caused by waves, eliminating the risk of resonance occurrences.

DETAILED DESCRIPTION OF THE INVENTION

In order to facilitate comprehension of the invention, its detailed description will be made based on the figures accompanying this report, of which they are a whole part.

Figure 1:
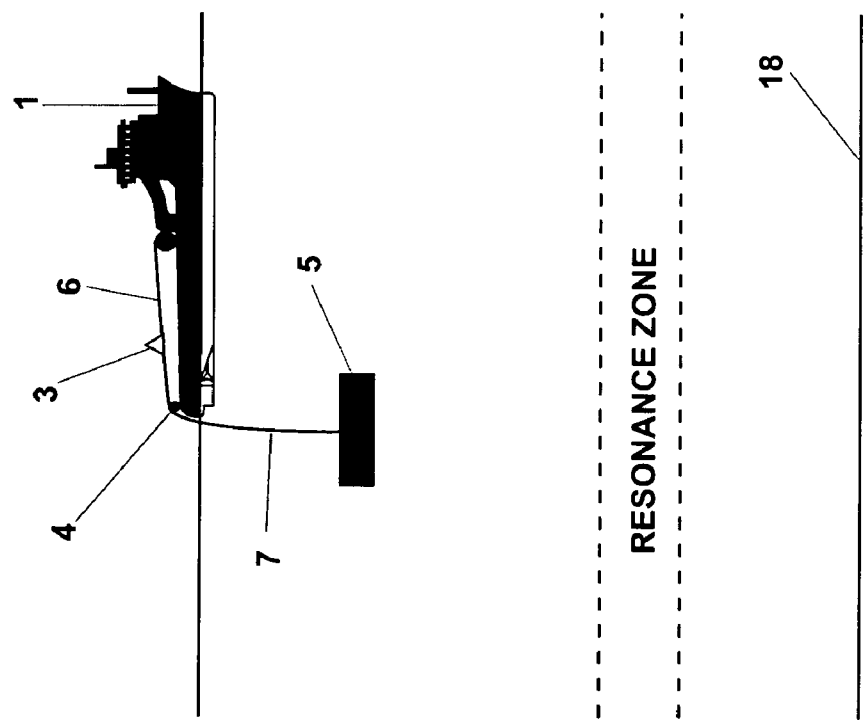
FIG. 1 shows equipment positioned to be lowered to sea bottom and the resonance area.

As shown in FIG. 1, the present invention refers to a process to lower to the sea bottom (18) equipment (5) especially of large size and mass, such as manifolds, used in submarine oil exploration fields, especially deep waster fields. Thus, equipment (5) must be previously prepared in a tug boat (1) to start the process.

It is preferred that equipment be prepared, using the process described also in the co-pending Brazilian patent application, named "AUXILIARY FLOATING STRUCTURE AND PROCESS FOR DESCENT OF EQUIPMENT TO THE SEA," still not published and of the same author of the present invention, because it will thus already be prepared for utilization in accordance with the process of the present invention. Nevertheless, any other preparatory process may be used, as long as it permits installation of auxiliary component (3) and connection of cables (6 and 8) used in the present invention.

Figure 2:
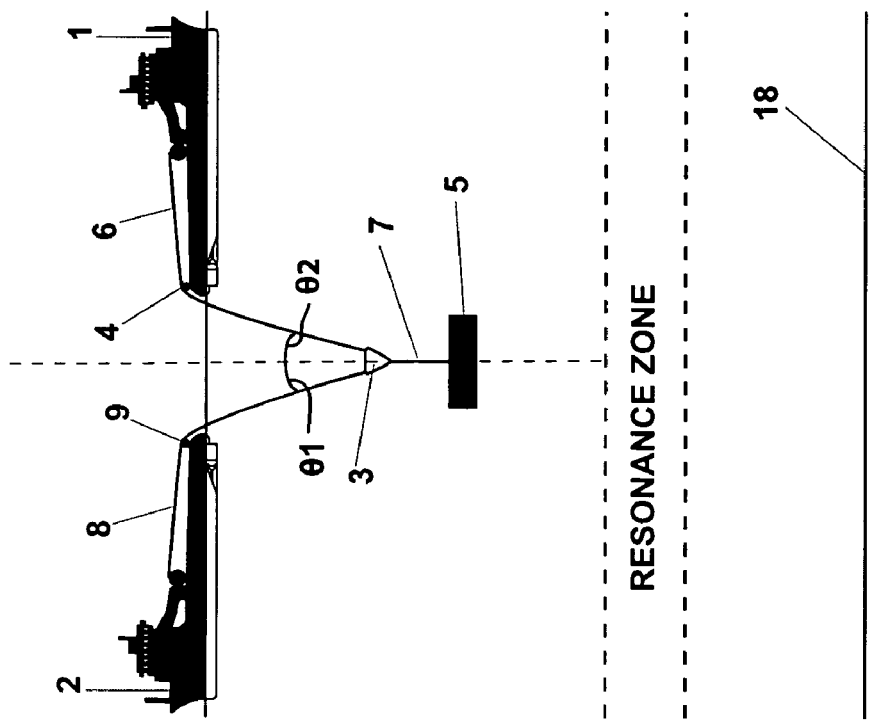
FIG. 2 features descent of equipment before attaining resonance area, according to the process of the present invention.

Being previously prepared in the present case means that equipment (5) to be lowered to sea bottom (18) is submerged for some meters, suspended by a tug boat (1). As shown in FIG. 2, equipment (5) is being maintained in suspended condition by means of a sling (7), whose end section at the deck is compatible with an application of an auxiliary component (3), permitting to receive in its tension line the cable (8) of a second tug boat (2), which is attached, by means of this same auxiliary component (3), to cable (6) of tug boat (1). The sling (7) must be adequately tied at the deck, for example by means of a "shark-jaw" type brake, alleviating tension from this point backwards, which facilitates attaching cables (6 and 8) and equipment (5) on auxiliary component (3).

The auxiliary component (3) is preferably a triplate, but may also be a large ring (19) or any other device, permitting freedom of movement to cables attached to it. Freedom of movement in the present sense means the possibility of dampening movements of tug boats, caused by ocean waves, minimizing transmission of vertical movements to equipment (5).

With equipment (5) already prepared, tug boat (1) positions itself in spot of descent and awaits approach of the second tug boat (2) until a point, where it is possible to transfer the cable (8) of the second tug boat (2) to tug boat (1). Cable (8) is then attached to auxiliary component (3).

Figure 6:
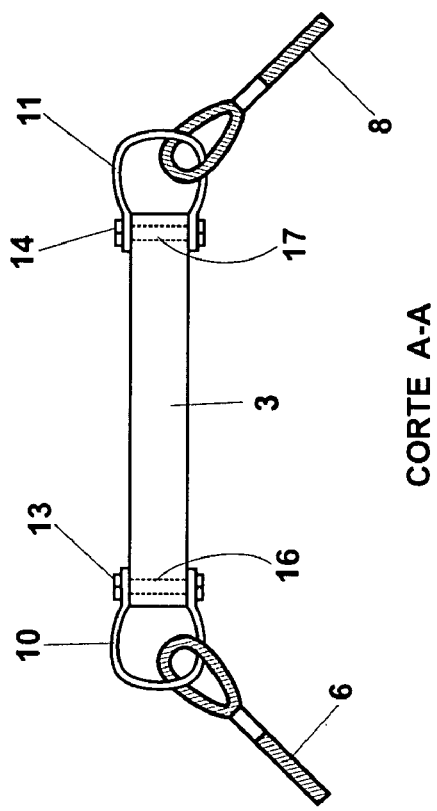
FIG. 6 is a cross section as indicated in FIG. 5.
Figure 5:
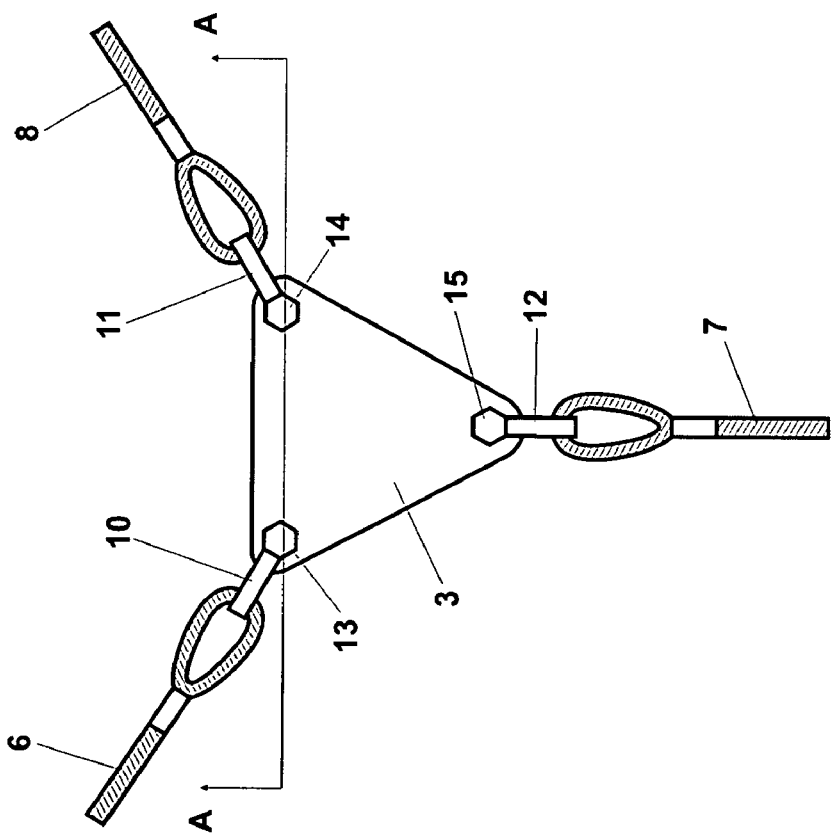
FIG. 5 features, in detail, attachment between auxiliary components, cables and equipment to be lowered.

As shown in detail in FIGS. 5 and 6, connectors (10 and 11), which are preferably shackles, are passed through the span of cables (6 and 8) and attached to auxiliary component (3) by screws (13 and 14). Thus, connectors (10 and 11) may carry out a pivotal movement around holes (16 and 17) of auxiliary component (3), absorbing almost entirely the oscillations of tug boats (1 and 2), caused by waves, without transmitting same to the equipment (5). Reduction of transmission of oscillations is even enhanced by the fact that cables (6 and 8) form an angle with the vertical section. Sling (7) suspending equipment (5), on its turn, is attached to auxiliary component (3) by means of connector (12) and screw (15).

In the event the auxiliary component should be a large ring (19), two alternatives may be used. The first one consists in attaching cables (6 and 8) from tug boats (1 and 2) to large ring (19) by means of two connectors, using an assembly similar to the triplate. The second alternative, as shown in FIGS. 7 and 8, consists in passing cable (6) from tug boat (1) through large ring (19), attaching cable (8) of the second tug boat (2) to large ring (19) through connector (20) and screw (21). This latter construction permits to vary the meeting point between the two cables (67 and 8).

Thus, a situation is being created where equipment (5) may be lowered without oscillating upwards and downwards, eliminating the risk of the entire set becoming resonant while crossing the resonance area.

After conclusion of the above operation, tug boat (1) releases sling (7) and both tug boats (1 and 2) position themselves adequately and start to release cables (6 and 8) as shown in FIG. 2. At this moment, sling (7) already trespassed stem roller (4) and equipment (5) is suspended by cables (6 and 8), supported on stern rollers (4 and 9) of both tug boats (1 and 2).

Both tug boats (1 and 2) maneuver until an adequate distance, at the same time in which they extend cables (6 and 8), permitting a small descent of equipment (5). As of this point, they again approach reciprocally, thus permitting descent of equipment (5). During descent of equipment (5), tug boats (1 and 2) are maneuvering and controlling cables (6 and 8), based on the control of three variables, such as relative position of boats, crane and boat speed and length of cables, so that movement caused by waves is being absorbed by pivotal action of connectors (10 and 11) around the holes of auxiliary component (3), not being transferred to equipment (5). It is convenient to remember that with devices permitting to identify their perfect location, such as DGPS (Differential GPS or Differential Global Positioning System) and other devices insuring they carry out precise maneuvers in sea. Preferably, both the auxiliary component (3) as well as equipment (5) also should receive position signaling devices, which facilitate descent control of the latter.

Figure 4:
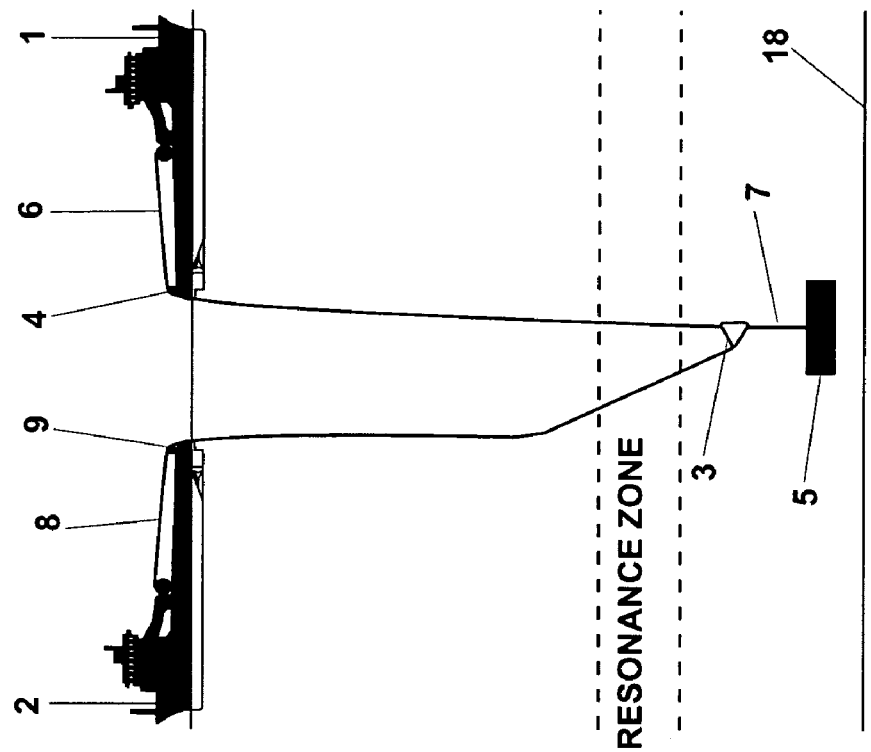
FIG. 4 features transfer of descent of equipment to only one vessel after passing thru resonance area.
Figure 3:
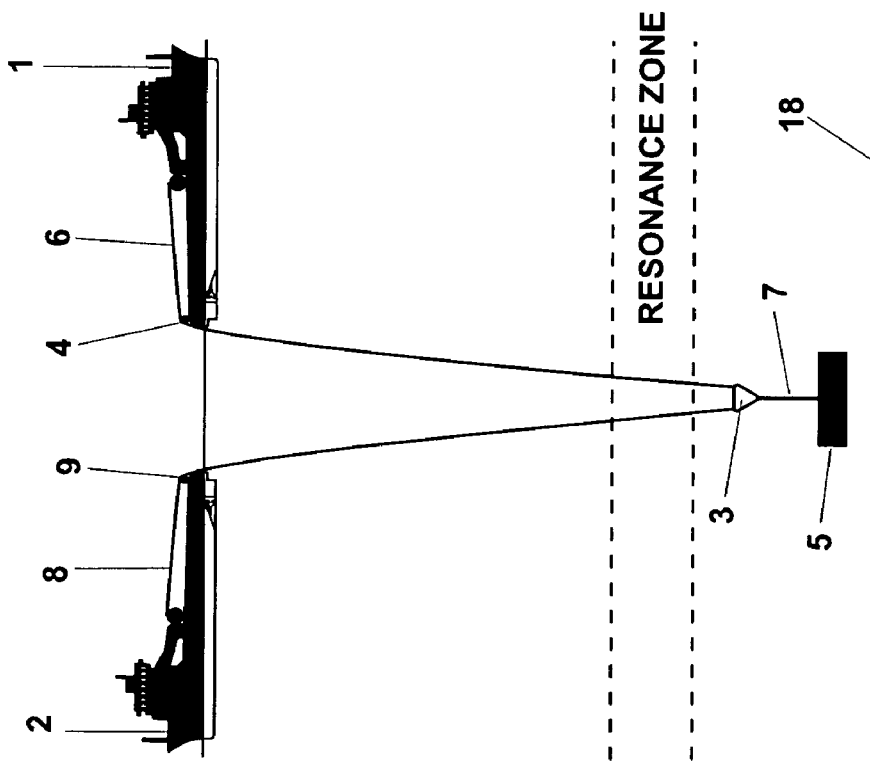
FIG. 3 features descent of equipment after passing thru the resonance area, according to the process of the present invention.

After equipment (5) surpasses the resonance area, its descent may continue to be made by only one of the tug boats (1 or 2), as shown in FIG. 4. Or, preferably, both tug boats will remain operating until arrival of equipment (5) to sea bottom (18).

While the "PROCESS FOR DESCENT OF EQUIPMENT TO THE SEA BOTTOM," which has now been described with regard to the attached drawings, is being shown as a form of preferred accomplishment of the invention, it will be understood that several changes may be introduced without abandoning the concept presented herein and some elements may be replaced by others with the same technical function, especially the materials and equipment utilized, their sizes, forms and proportions.

What is claimed is:

1. A process for lowering equipment of large size and mass through a resonance zone to the sea bottom, in which said equipment to be lowered to said sea bottom is submerged some meters and suspended by means of a sling, supported on a stern roller of a first tug boat, the process comprising the following maneuvers:

adequately tying said sling to a first cable of said first tug boat by using a tri-plate as an auxiliary component by means of connections and screws;

approaching a second tug boat toward said first tug boat until a point where said second tug boat may transfer a second cable from said second tug boat to said first tug boat;

attaching said second cable from said second tug boat to said auxiliary component by means of connectors and screws, in order that said first cable, said second cable and said auxiliary component compose a connection, wherein said connectors may carry out pivotal movements around holes of said auxiliary component;

releasing said sling from said first tug boat and lowering said sling until said auxiliary component passes said stern roller of said first tug boat, with said equipment being suspended by said first and second cables and being supported on stern rollers of both of said tug boats;

maneuvering both of said tug boats to within an adequate distance from one another and extending, simultaneously, said first and second cables, thereby permitting a restricted descent of said equipment;

renewing an approach of both of said tug boats toward one another, thus permitting a further descent of said equipment; and carrying out maneuvers and cable control of said tug boats, based on control of three variables, namely relative positioning of said tug boats, speeds of winches, associated with said cables, and of said tug boats and the lengths of said cables, wherein said pivotal movements of said connectors function to almost entirely absorb wave induced oscillations of both of said tug boats, without transmitting said oscillations to said equipment, as said equipment is lowered through said resonance zone toward said sea bottom.

2. The process for lowering equipment of large size and mass through a resonance zone to the sea bottom according to claim 1, characterized in that both said auxiliary component and said equipment receive position signalizing devices in order to grant that both first and second cables are being maintained in position to form a "Y" configuration, reducing additionally the transmission of oscillations, caused by said waves on said equipment.

3. The process for lowering equipment of large size and mass through a resonance zone to the sea bottom according to claim 1, characterized in that both cables are being maintained in an angle within a vertical plane, additionally reducing the transmission of oscillations, caused by said waves on said equipment.

4. The process for lowering equipment of large size and mass through a resonance zone to the sea bottom according to claim 1, characterized in that said lowering of equipment to said sea bottom is being accomplished by only one of said tug boats after said equipment has passed through said resonance area.

5. The process for lowering equipment of large size and mass through a resonance zone to the sea bottom according to claim 1 wherein said process facilitates an active, dynamic control, in real time, of a natural frequency of said equipment.

6. A process for lowering equipment of large size and mass through a resonance zone in the open sea, to the sea bottom, wherein said equipment is submerged and is suspended by means of a sling supported on a stern roller of a first tug boat, said process comprising:

mechanically associating an auxiliary component with said sling;

pivotally interconnecting said auxiliary component to a first cable of a first tug boat;

providing a second tug boat having a second cable;

transferring a portion of said second cable from said second tug boat to said first tug boat;

pivotally securing said second cable to said auxiliary component to form a pivoted interconnection of said first cable, said second cable and said sling for substantially absorbing the forces resulting from oscillations of both tug boats, as produced by sea waves, without transmitting said forces to said equipment;

lowering said sling into the sea until said auxiliary component passes a stern roller of said first tug boat, wherein said equipment is suspended in the sea by said first and second cables, with each said cable being supported by a stern roller of each said cable's respective tug boat;

said first and second tug boats extending simultaneously their respective first and second cables to facilitate a restricted descent of said equipment; and maneuvering said tug boats toward one another to facilitate yet a further descent of said equipment;

wherein said pivoted interconnection functions to almost entirely absorb the effect of said wave induced oscillations of both of said tug boats, thereby minimizing any transmission of said effect of said oscillations to said equipment, as said equipment is lowered through said resonance zone toward said sea bottom.

7. The process of claim 6 wherein said pivoted interconnection of said first cable, said second cable and said sling through intermediation of said auxiliary component forms an upright Y-shaped configuration.

8. The process of claim 6 wherein said sling and said first cable constitute a single integral cable.

* * * * *